UNITED STATES PATENT OFFICE.

HARRY S. MORK, OF BROOKLINE, MASSACHUSETTS, ASSIGNOR, BY MESNE ASSIGNMENTS, TO AMERICAN LA FRANCE FIRE ENGINE COMPANY, INC., OF ELMIRA, NEW YORK, A CORPORATION OF NEW YORK.

FIRE-EXTINGUISHER COMPOSITION.

1,278,715.  Specification of Letters Patent. Patented Sept. 10, 1918.

No Drawing. Application filed January 14, 1918. Serial No. 211,834.

*To all whom it may concern:*

Be it known that I, HARRY S. MORK, a citizen of the United States, residing at Brookline, county of Norfolk, State of Massachusetts, have invented a certain new and useful Fire-Extinguisher Composition, of which the following is a specification.

My invention relates to fire extinguisher charges and more particularly to the carbonate solution from which carbon dioxid for expelling the extinguishing medium is generated by reaction with a suitable acid. Bicarbonate of sodium has already been employed for such solutions, while sulfuric acid or hydrochloric acid has usually been employed as the acid charge. In order that the solution may always remain in a condition suitable for use even when exposed to low temperatures, it has been proposed to incorporate in the solution, an ingredient for lowering the freezing point thereof. Most of those ingredients which have been heretofore proposed for this purpose are subject to one disadvantage or another. In some instances, the addition agent tends to give rise to the formation of a precipitate of insoluble carbonate or other salt or to retard the generation or evolution of the carbon dioxid gas; or its effect in small quantities has not been sufficiently marked in depressing the freezing point.

The object of my invention is to produce a carbonate solution charge of the desired low freezing point which shall be free from the disadvantages above noted. At the same time, the invention seeks to avoid the use of ingredients which might involve undue expense, or which would in any way interfere with the fire extinguishing qualities of the medium which is to be ejected from the apparatus.

The carbonate solution embraced by my present invention, comprises as essential ingredients, bicarbonate of sodium and an alkali metal lactate, especially the lactate of sodium. These essential ingredients may be dissolved for example in water.

To clearly illustrate the principles of the invention, I shall describe a specific embodiment thereof, in which the solution comprises as its essential ingredients, bicarbonate of sodium and lactate of sodium. It will be understood that these ingredients are present in a water solution. These solutions may be made up for example, in the proportions of 5.53 grams of sodium bicarbonate and 33 grams of sodium lactate dissolved in 100 cubic centimeters of water. Such a solution exhibits a freezing point of close to —46° F. It is adapted to serve as an efficient medium for the extinction of fire and may be employed in well known manner as a charge for fire extinguishers in which an acid charge, such as for example hydrochloric acid or sulfuric acid, is caused to react upon the carbonate solution for the generation of a pressure gas in the form of carbon dioxid, by which the contents of the extinguisher are expelled upon the fire.

The proportions above recited may be varied as desired, but I prefer to maintain substantially or approximately those given.

When potassium lactate is employed with the sodium bicarbonate solution, it may advantageously be used in about the proportions of for example 5.53 grams sodium bicarbonate and 70.3 grams potassium lactate in 100 cc. of water. These proportions may of course be varied without departing from the principles of the invention. The proportions mentioned give a freezing point below —71° F.

I claim:—

1. A carbonate solution for fire extinguishers, comprising as essential ingredients, sodium bicarbonate and an alkali metal lactate.

2. A carbonate solution for fire extinguishers, comprising as essential ingredients, sodium bicarbonate and sodium lactate.

3. A carbonate solution for fire extinguishers, comprising as essential ingredients, sodium bicarbonate and sodium lactate, substantially in the proportions of 5.53 grams of sodium bicarbonate and 33 grams of sodium lactate in 100 cubic centimeters of water.

HARRY S. MORK.